United States Patent

Nicot

[11] Patent Number: 5,803,419
[45] Date of Patent: Sep. 8, 1998

[54] SUPPORT DEVICE FOR MEASURING SENSOR

[75] Inventor: Christophe Nicot, Annecy, France

[73] Assignee: The Torrington Company, Torrington, Conn.

[21] Appl. No.: 761,238

[22] Filed: Dec. 6, 1996

Related U.S. Application Data

[63] Continuation of Ser. No. 454,991, May 31, 1995, abandoned.

[30] Foreign Application Priority Data

Mar. 31, 1995 [FR] France .................................. 95 03801

[51] Int. Cl.$^6$ ...................................................... F16L 3/08
[52] U.S. Cl. ........................ 248/224.7; 248/27.3; 248/56; 324/173
[58] Field of Search ........................ 248/27.3, 56, 224.7, 248/231.9, 309.1, 314, 534, 674; 324/173, 175, 207.25

[56] References Cited

U.S. PATENT DOCUMENTS

| | | | |
|---|---|---|---|
| 2,236,496 | 4/1941 | Beggs | 248/27.3 |
| 2,954,248 | 9/1960 | Brickman | 248/56 X |
| 3,221,572 | 12/1965 | Swick | 248/56 X |
| 3,794,278 | 2/1974 | Frey, Jr. et al. | 248/27.3 |
| 4,463,312 | 7/1984 | Oda et al. | 324/174 |
| 4,511,840 | 4/1985 | Leach, Jr. | 248/201 X |
| 4,602,506 | 7/1986 | Sawamoto et al. | 73/115 |
| 5,438,260 | 8/1995 | Rigaux et al. | 324/173 X |

FOREIGN PATENT DOCUMENTS

| | | | |
|---|---|---|---|
| 791966 | 8/1968 | Canada | 248/27.3 |
| 0 092 605 | 11/1983 | European Pat. Off. | |
| 0 607 719 A1 | 7/1994 | European Pat. Off. | |
| 2053593 | 4/1971 | France | |
| 23 60 359 | 6/1975 | Germany | |
| 2538083 | 3/1977 | Germany | 248/27.3 |
| 32 29 207 | 4/1984 | Germany | |
| 61484 | 8/1948 | Netherlands | 248/27.3 |
| 541793 | 12/1941 | United Kingdom | 248/27.3 |
| 755496 | 8/1956 | United Kingdom | 248/27.3 |

Primary Examiner—Ramon O. Ramirez
Assistant Examiner—Anita M. King
Attorney, Agent, or Firm—John C. Bigler

[57] ABSTRACT

A support device including a clamping sleeve mountable in a hole and which applies a retaining force to a sensor. A wall of the sleeve bears an elastic means for locking the sleeve in the hole and an elastic means for axially retaining the sensor.

3 Claims, 4 Drawing Sheets

SUPPORT DEVICE FOR MEASURING SENSOR

This application is a continuation of application Ser. No. 08/454,991, filed May 31, 1995 now abandoned.

BACKGROUND OF THE INVENTION

This invention relates generally to a support device for a measuring sensor and, more particularly, to a clamping sleeve mountable in a mounting hole and which applies a retaining force on a measuring sensor.

European Patent No. A 92,605 describes a sleeve in which a rate sensor is mounted so that it is slidable and receives an axial thrust toward an encoding element carried by the rotary part of a bearing.

The detection sensitivity of the rotation speed necessitates an accurate positioning and locking of the sensor in the variable magnetic induction field, generated by a magnetic rotary encoding element. The positioning and locking of the sensor are particularly important since the encoding element has small dimensions. Consequently, the axial and angular position of the sensor with respect to the encoding element must remain invariable while measuring the speed.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing a support device for a measuring sensor to be mounted in a hole and which applies a retaining force to the sensor. The support device comprises a sleeve mountable in the hole and having a wall. The wall of the sleeve bears an elastic means for blocking the sleeve in the hole and elastic means for axially retaining the sensor.

The foregoing and other aspects will become apparent from the following detailed description of the invention when considered in conjunction with the accompanying drawing figures.

BRIEF DESCRIPTION OF THE DRAWING FIGURES

Figure 1:
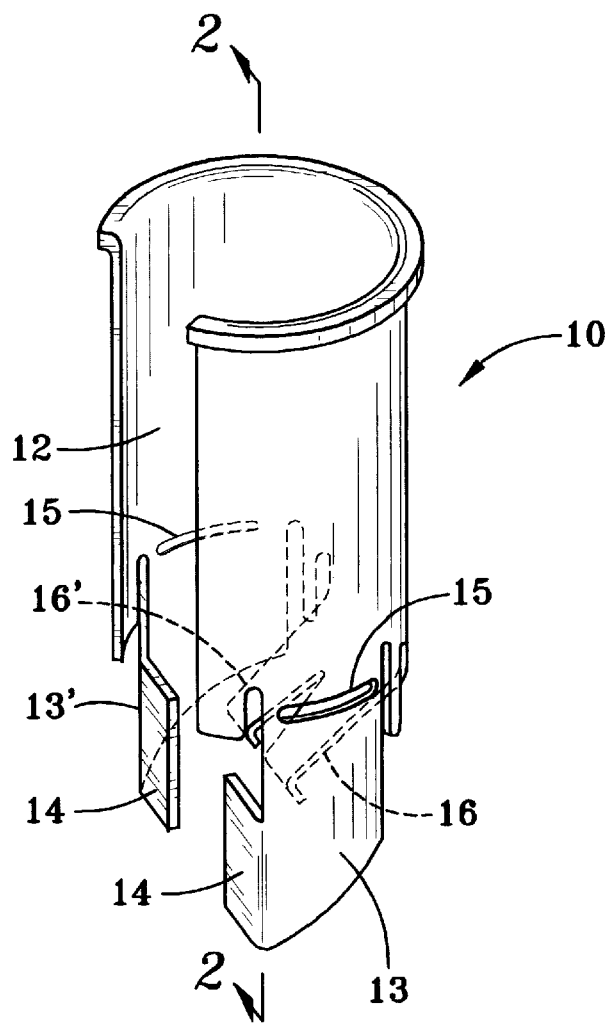
FIG. 1 is a perspective view illustrating an embodiment of the support device for a measuring sensor of the present invention.
Figure 3:
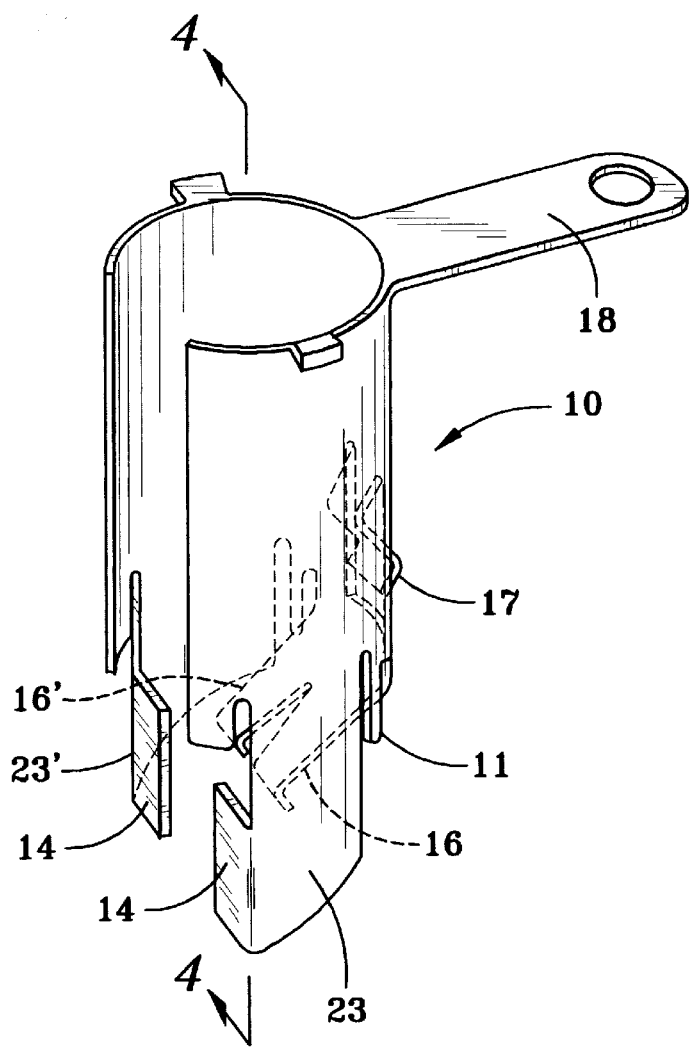
Figure 4:
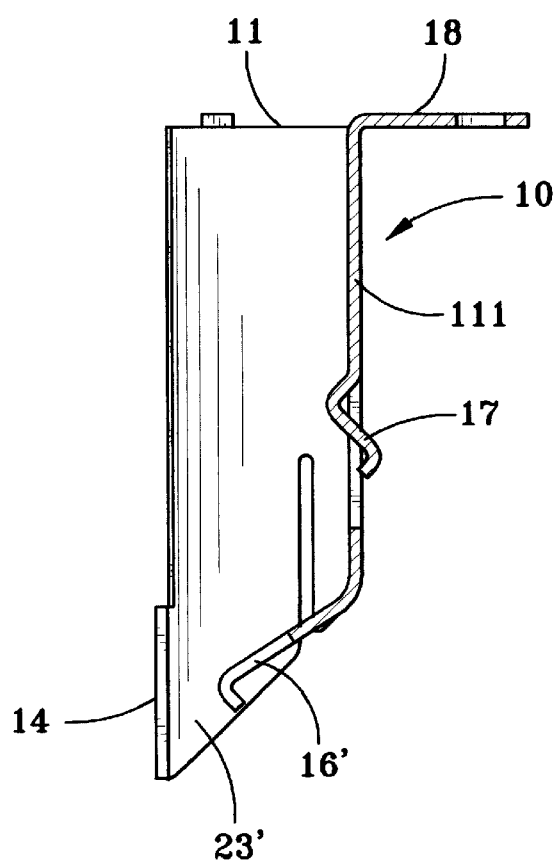
Figure 5:
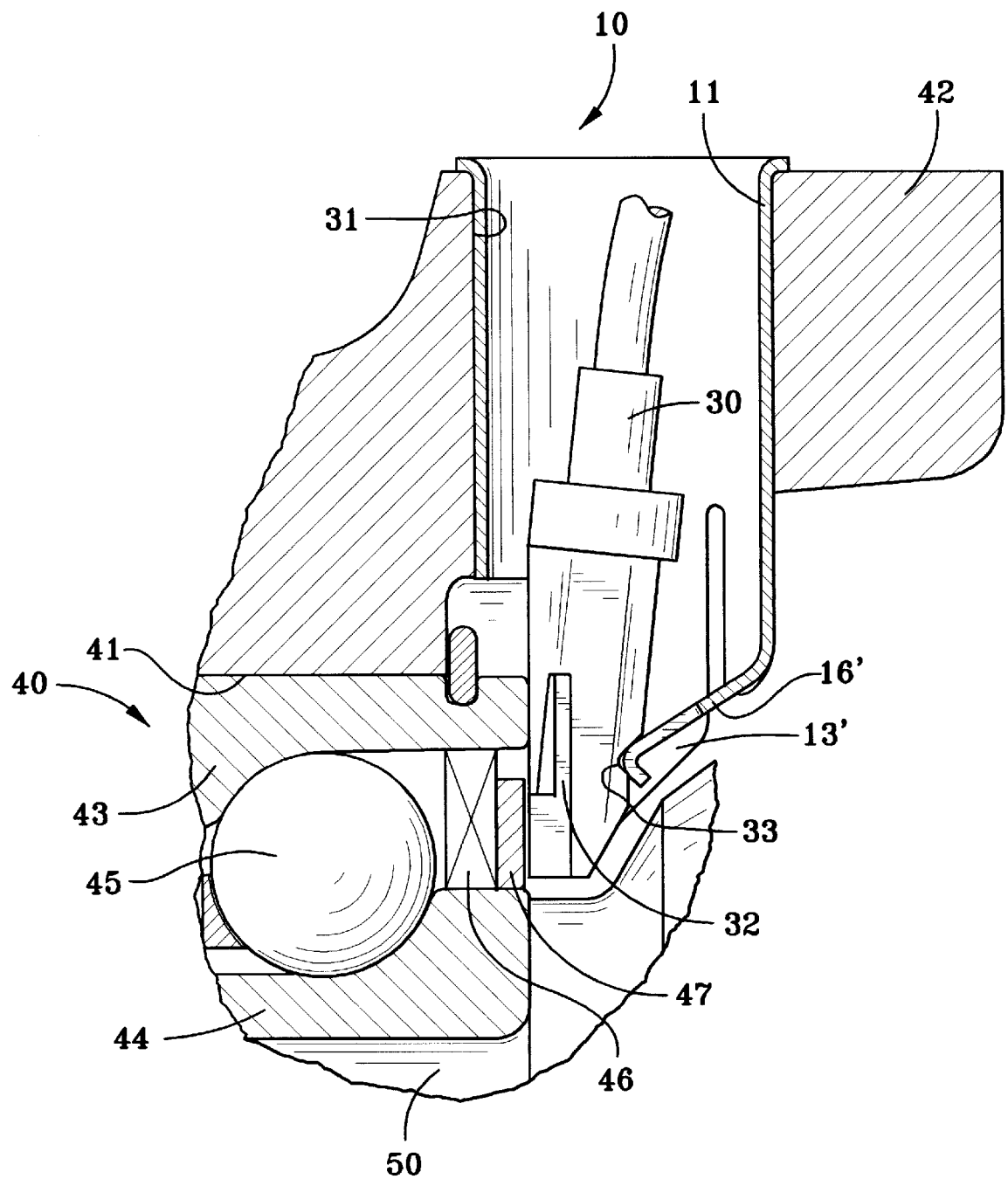
Figure 6:
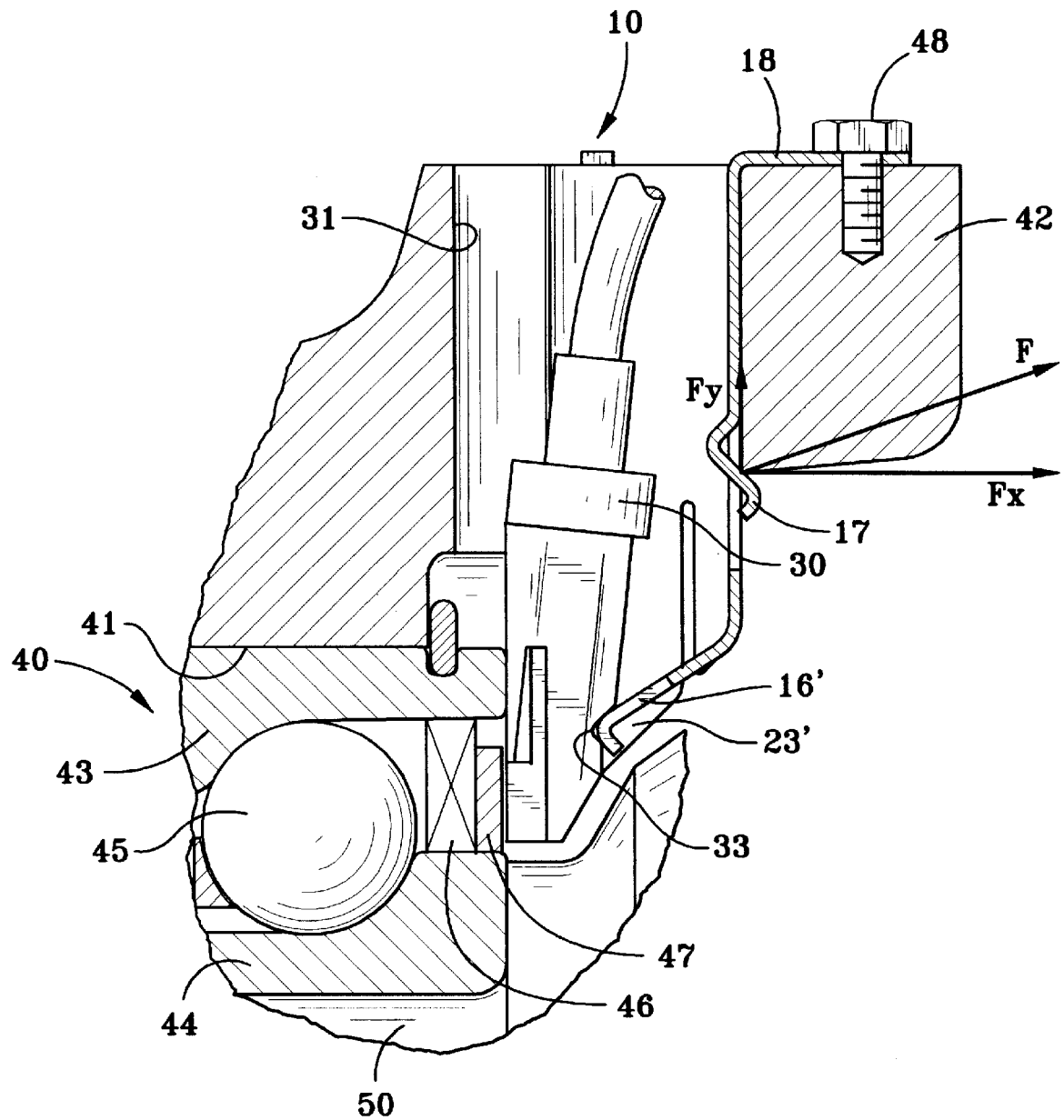

FIG. 3 a perspective view illustrating an alternative embodiment of the support device for a measuring sensor of the present invention;

FIG. 4 is an axial sectional view illustrating the embodiment of the support device shown in FIG. 3;

FIG. 5 is a representation illustrating mounting of the support device shown in FIG. 1 for applying the support device to a ball bearing mounted in a spindle holder; and FIG. 6 is a representation illustrating mounting of the support device shown in FIG. 3 for applying the support device to a ball bearing mounted in a spindle holder.

For simplification, the same references are used in the following description of the different elements and components of the device in its various embodiments.

DETAILED DESCRIPTION

Figure 2:
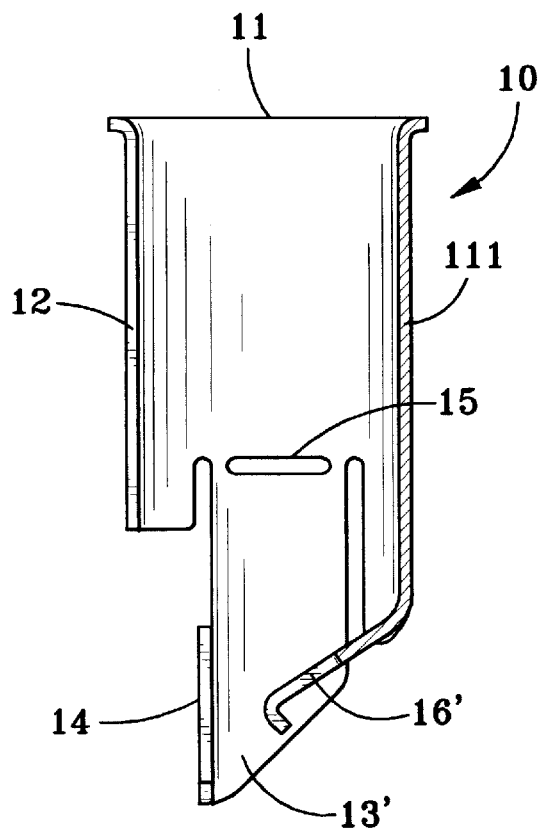
FIG. 2 is an axial sectional view illustrating the embodiment of the support device shown in FIG. 1.

Referring now to the drawings, FIGS. 1, 2, and 5, illustrate a support device designated by reference 10, as a full assembly, enclosing a speed measuring sensor 30 depicted in FIG. 5. Sensor 30 includes, as is well known to the expert, an element for measuring the magnetic field, integrated in a protective head.

Support 10 essentially includes elastic cylindrical clamping sleeve 11, provided with longitudinal slot 12, to be introduced into mounting hole 31. A wall 111 of sleeve 11 bears, according to the invention, on the one hand, an elastic means for locking sleeve 11 in hole 31 and, on the other hand, an elastic means for retaining sensor 30 along the axis after introducing it into the sleeve.

According to one feature of the invention, sleeve 11 has two blocking fingers 13, 13' that extend axially to one end of the sleeve below hole 31. Each finger, such as 13, 13', has a fold whose edge forms positioning rib 14 engaged in a corresponding axial groove 32 of sensor 30.

In order to make it easier to bend and radially separate one finger or both of them 13, 13' and to lock the sleeve in its hole 31 after introducing sensor 30 in the sleeve in contact with positioning rib 14, as a nonlimiting example, the root area of the finger bears an oblong opening 15 shown in FIG. 2. The presence of the oblong opening reduces the rigidity of either or both fingers 13, 13' and thereby facilitates a longitudinal bending and radial separation of said fingers during mounting of the sensor.

Moreover, sleeve 11 bears a retaining means that permits the elastic retention of sensor 30 in contact with a transverse groove 33 carried by the protective head of said sensor. Such a retaining means may be formed of two cut out lugs 16, 16'.

According to another characteristic of the invention, blocking fingers 13, 13' and retaining lugs 16, 16' a steel metal plate before that is subsequently rolled to form an essentially cylindrical shape.

The alternative embodiment of the support device shown in FIGS. 3, 4, and 6 is made up of sleeve 11 that encloses sensor 30. Sleeve 11 has elastic locking lug 17 connected to wall 111 of the sleeve that, in the present case, applies an elastic bearing force F having a components Fx and Fy, at least one of said components facilitating the axial and radial positioning of the sleeve in its hole 31.

Sleeve 11 has, according to the variant depicted, locking lug 18 in contact with an edge where said sleeve is inserted into hole 31. Locking lug 18 somewhat compensates for the insufficient blocking effect of end fingers 23, 23' fitted with their guide rib 14.

The mountings for applying the device to a ball bearing are described below in reference to FIGS. 5 and 6. The bearing shown in FIGS. 5 and 6 includes a detachable ball bearing 40 locked in bore 41 of spindle holder 42 of a motor vehicle wheel. Ball bearing 40 is made up, as is well known to the expert, of fixed outer ring 43, rotary inner ring 44 mounted on shaft 50, and of rolling bodies 45 placed between said rings.

The preassembled seal, designated as a full assembly by reference 46 as described, for example, in European Patent No. A 607,719, is mounted between said rings. Encoding element 47, interlocked to permit the free rotation of rotary inner ring 44 or rotary element of the packing, travels angularly in front of sensor 30 retained in clamping sleeve 11, as described in reference to FIGS. 1, 2 or 3, 4. The aforementioned mounting permits an accurate positioning of sensor 30 in front of encoder 47 via the sleeve 11.

In reference to FIG. 6, it should be pointed out that locking lug 18 of sleeve 11, in contact with an edge where the sleeve is introduced into hole 31 of spindle holder 42, receives an additional clamping means in the form of bolt 48.

According to the invention, the wall of the sensor's clamping sleeve provides an elastic means for blocking said sleeve in the mounting hole and an elastic means for retaining the sensor axially. In the device thereby constructed, the means for blocking the sleeve and the means for retaining the sensor are elastic supports that are independent of the encoding element's location.

The device according to the invention provides simultaneously locking and positioning the sensor in front of the encoding element and making it easier to disassemble it for a possible replacement of the sensor element. The device is particularly applicable to speed measurement.

Other characteristics and advantages of the invention will become apparent by reading the description of an embodiment example of the device indicated in the attached drawing wherein:

Having described the invention, what is claimed is:

1. A support device in combination with a sensor including a groove, the support device to be received within a mounting hole, the combination comprising:

a securing sleeve having a wall that is provided with resilient securement means for locking said securing sleeve in said mounting hole and axial retention elastic means for retaining said sensor in said securing sleeve, said elastic means respectively formed by at least one blocking finger and at least one elastic retention finger that are cut out from a metal plate that is subsequently rolled to form a substantially cylindrical configuration in which said at least one retention finger and said at least one blocking finger are connected to the wall, so that said at least one blocking finger is adapted to extend axially beyond the mounting hole, and a positioning rib that cooperates with the groove of the sensor to orientate the sensor in the securing sleeve.

2. The combination according to claim 1, wherein the wall of the securing sleeve includes a longitudinal flexible section that cooperates with the sensor to radially spread the longitudinal flexible section against the mounting hole during mounting of the sensor in the securing sleeve.

3. The combination according to claim 1, further comprising an elastic locking lug for engagement with said mounting hole to exert an abutment force on said sleeve to axially and radially position the securing sleeve in the mounting hole.

\* \* \* \* \*